July 2, 1929.　　　　　R. B. LYTTLE　　　　　1,719,300
PISTON AND PISTON RING
Filed April 16, 1925
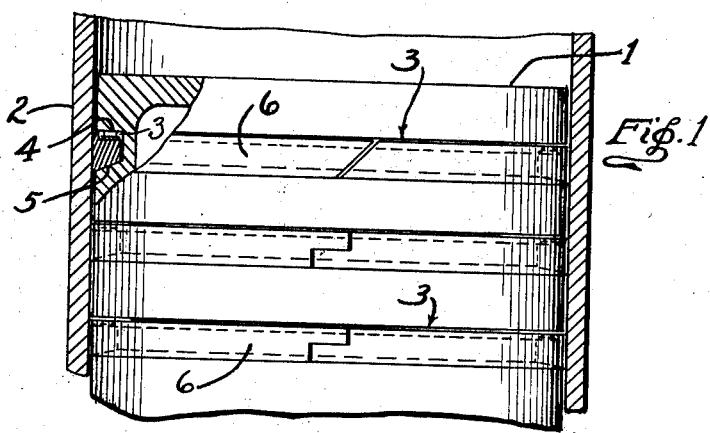
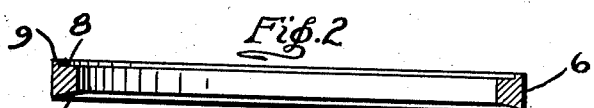
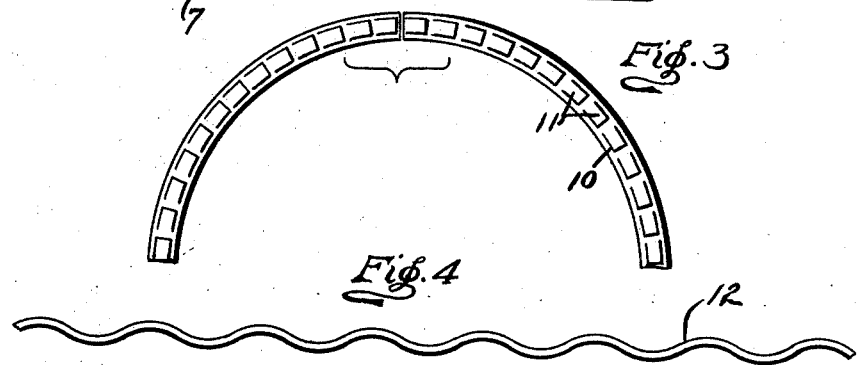
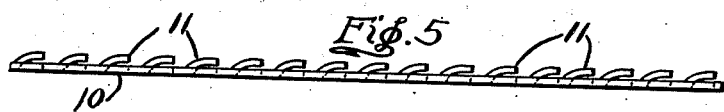
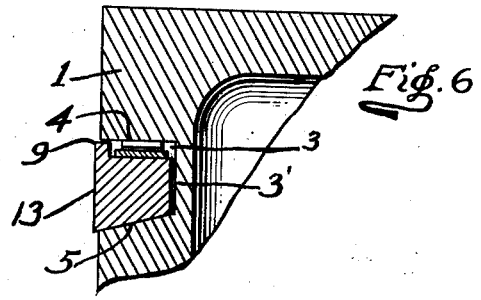
WITNESS
Robt. S. Woolsey
INVENTOR
ROWLAND B. LYTTLE
by James R. Townsend
his atty.

Patented July 2, 1929.

1,719,300

UNITED STATES PATENT OFFICE.

ROWLAND B. LYTTLE, OF LOS ANGELES, CALIFORNIA.

PISTON AND PISTON RING.

Application filed April 16, 1925. Serial No. 23,457.

The prime object of my invention is to provide a piston ring which will effectively seal the combustion chamber, without excessive wall pressure and which will steady the piston in the cylinder and prevent piston slapping and oil pumping.

Another object is to provide novel means whereby the ring is held on a seat in the ring groove at all times, thus preventing oil pumping or pressure leak and excessive wear of the ring grooves.

A further object is to provide a spring actuated piston ring, in which the spring is so positioned that it will not come in contact with the cylinder walls when in use.

My invention is applicable to any piston where piston rings are used, but is particularly applicable to reciprocating pistons in internal combustion engines, and is provided with a downwardly and outwardly inclined surface, and hold a piston ring on said seat by means of a spring positioned on the top of the ring, the force of said spring urging the ring downwardly on said inclined surface and only a component force of such spring forcing said ring outwardly against the walls of the cylinder.

Other objects, advantages and features of invention may appear from the accompanying drawing, the subjoined detail description and the appended claims.

The accompanying drawing illustrates my invention.

Figure 1 is a side elevation of a portion of a piston having therein piston rings constructed in accordance with my invention. A fragment of the piston and one ring is broken away to show hidden parts.

Fig. 2 is a transverse sectional view of my improved ring detached from the piston.

Fig. 3 is a fragmentary plan view of the spring employed in my ring.

Fig. 4 is a developed fragmentary side view of a modified form of spring.

Fig. 5 is a developed fragmentary side view of the spring shown in Fig. 3.

Fig. 6 is a fragmentary sectional view of a piston and ring embodying my invention.

A piston 1 is reciprocally mounted in the cylinder 2, and has a plurality of ring grooves 3, formed therein. The upper walls 4 of the grooves 3 are cut normal to the inner walls 3' thereof, and the lower walls 5 are cut at an angle inclining downwardly and outwardly at an angle of about 15°, more or less.

A split ring 6, the meeting edges of which may be step cut, lapped, or otherwise, is provided in each of the grooves 3, and extending from the circular working surface 13 thereof, and upper and lower walls. The lower wall 7 of ring 6 is cut at the same angle as the wall 5, inclining inwardly and upwardly and is adapted to seat on said wall 5.

An annular groove 8 is formed in the upper face of the ring 6, which preferably extends from the inner edge thereof to adjacent the outer edge, leaving a flange 9 remaining around the outer periphery of the ring.

A spring 10 is positioned in the groove 8 and operates between the upper wall 4 and the floor of the groove 8 and is preferably in the form of a split annular ring having upstanding spring fingers 11 extending therefrom, which engage the groove wall 4.

Any other desirable form of spring can also be used such as the crimped spring wire 12 shown in Fig. 4.

In operation the spring 10 holds the ring firmly on the inclined wall 5, thus preventing alternate engagement of the ring with the upper wall 4 and lower wall 5, and forming a positive seal, and thereby leakage or oil pumping is practically eliminated and this downward pressure of the spring provides sufficient friction on the inclined wall surface 5 to steady the piston in the cylinder and prevent what is known as piston slap.

By eliminating up and down play of the ring the groove will not wear.

The spring 10 exerts a downward force on the ring and due to the inclined meeting wall surfaces 5 and 7 only a component of this force urges the ring against the walls of the cylinder, thus relieving the walls of excessive ring pressure and wear. The flange 9 retains the spring 10 in the groove 8 and prevents the spring from engaging the walls of the cylinder. The adjacent surfaces 13 and wall surface 7 of the ring 6 form an acute angle with each other and thus provide on the ring 6 a sharp edge which serves to scrape oil from the cylinder walls and thereby remove any surplus oil.

I claim.

1. The combination of a piston having a groove therein, the lower wall of said groove being inclined, a piston ring in the groove, the lower face of said ring being inclined and adapted to co-operate with, and rest upon the lower wall of the groove; said ring having a groove in the top thereof, forming a flange around the outer periphery thereof; and a spring in said groove engaging said ring to force the same against the inclined lower face of said groove, and said spring being in the form of an annular split ring and having upstanding resilient fingers extending therefrom.

2. The combination of a piston formed with an annular groove, the lower wall of which is inclined inwardly and upwardly from the working surface thereof, a piston ring in said groove having a lower wall of the same slope as and corresponding to the inclined lower wall of the piston groove on which it is adapted to rest, said ring having a groove in the top extending from the inner edge to adjacent the outer edge to form a flange thereon, and an annular spring in the ring groove, said spring being provided with laterally projecting fingers adapted for engagement with the upper straight wall of the piston groove to force said ring against the inclined lower wall of the piston groove.

In testimony whereof, I have hereunto set my hand at Los Angeles, California, this 9th day of April, 1925.

ROWLAND B. LYTTLE.